R. ANDERSON.
Rice Huller.
No. 2,733. Reissued Aug. 13, 1867.
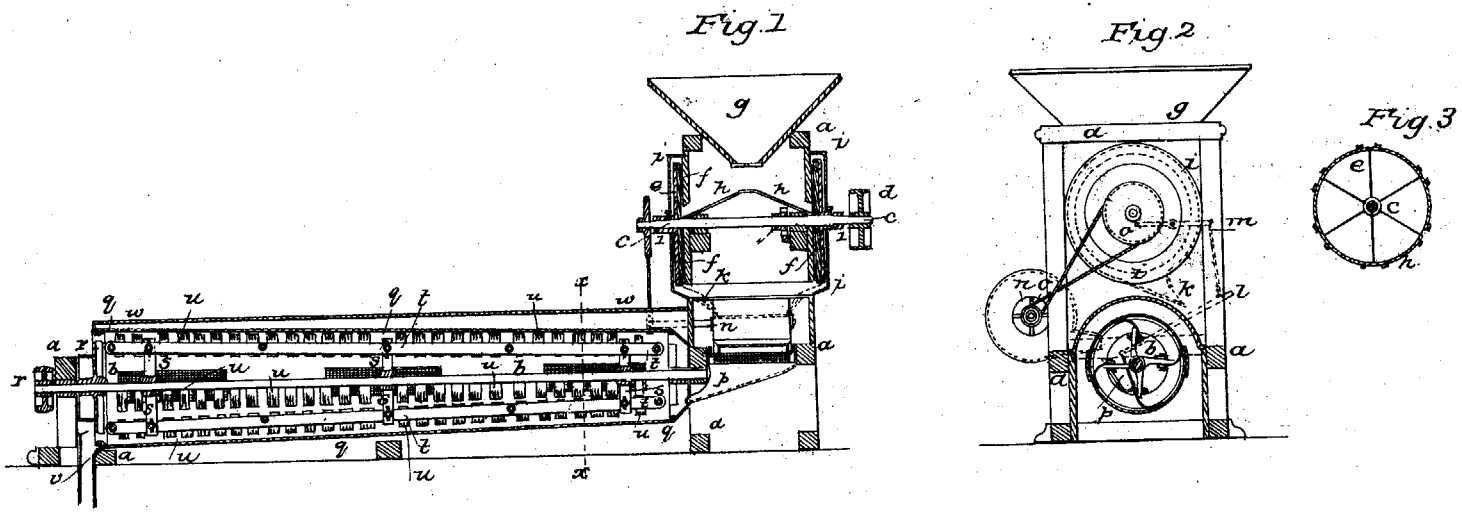
Witnesses
Lambert Lovell
Samuel L Anderson.
Inventor
Robert Anderson
N. PETERS, Photo-Lithographer, Washington, D. C.

United States Patent Office.

ROBERT ANDERSON, OF BROOKLYN, NEW YORK.

*Letters Patent No.* 27,195, *dated February* 21, 1860; *reissue No.* 2,733, *dated August* 13, 1867.

IMPROVEMENT IN MACHINES FOR HULLING RICE.

The Schedule referred to in these Letters Patent and making part of the same.

TO ALL WHOM IT MAY CONCERN:

Be it known that this specification, with the drawings which accompany and form part of it, is a full, clear, and exact description of certain new and useful improvements in Machinery for Hulling and Finishing Rice, invented by ROBERT ANDERSON, of Brooklyn, in the county of Kings, and State of New York. In said drawings—

Figure 1 represents a vertical longitudinal section of a machine constructed according to said improvements, and Figure 2 a transverse section thereof, at the line *x x* in fig. 1.

Similar letters refer to the same parts.

This invention relates to the finishing of rice after the operation of hulling, and it consists in the combination, with a surrounding case or polishing-cylinder, having a rough, stone-like character or inside surface, of a revolving shaft or frame, armed with beaters, of flexible material, of a flap form, in contradistinction to brushes, and by the action of which the rice is polished, or the refuse skin or "douse" lying between it and its hull rubbed off or removed, said surrounding case or polishing-cylinder rotating, it may be, in an opposite direction to the revolving beaters In said drawings, *a a* is a frame, carrying a horizontal shaft, *b*, that may be connected either directly or through an in ermediate shaft and belting to the second shaft *c*. *d* is a pulley or crank by which the shaft *c* is rotated, and also the disks *e e*, that are attached thereto, (see fig. 1,) and adjusted by set-nuts 1 1. The faces of these disks *c e* are lined with either natural or artificial stone, or substitute therefor of a porous, hard, and gritty nature, and which may be applied in sections bound by bands 2, (see fig. 1.) Against the sides of the machine are disks *f f*, of India rubber, or similar material. *g* is a hopper, from which a regulated discharge of rice passes on to inclines *h h*, that supply the same through an opening near the centre to the stone-lined disks *e e* and elastic disks *f f* composing the hullors. The hulls and rice, as they come from the hullers, are thrown into a casing, *i i*, and from thence by spouts *k k* conveyed to a screen, *l*, which is shaken by a lever, *m*, acted on by a cam or cams on the shaft *d*. *n* is a rotary blower that serves to remove the hulls and any grit or dirt falling through the screen, while the rice is taken by the trough *p* to the finishing-cylinder *q* that surrounds the shaft *b*, or the rice may be hulled and conveyed to the finishing-cylinder in any other suitable manner. The finishing-cylinder *q* is formed with open ends, and may be connected by arms to a journal-box at each end surrounding the shaft *b*, to admit of said cylinder being rotated as heretofore in one direction, say by power applied to a pulley, *r*, while the shaft *b* is revolved in the opposite direction by its pulley *r'*, or otherwise. The cylinder *q* may be provided with any desired number of openings, at proper intervals apart, said openings being covered with fine wire netting, so that dust may pass out but the rice be retained. The interior of the cylinder *q* may be coated with any appropriate gritty substance, such as sand, emery, or a suitable composition, so that it has a rough, stone-like character. Connected with the shaft *b* are arms *s s*, on to which are secured longitudinal clamping-bars *t t*, made adjustable on said arms nearer to or further from the shaft *b*, and serving to confine the flexible beaters *u u* of flap or thong character, and which may be composed of India rubber, soft leather, alum-dressed hide, or other suitable flexible material or compound, but alum-dressed hide is preferred as possessing a peculiar fitness for pearling or finishing rice, it being found that the glutinous skin of the rice does not adhere thereto, while the peculiar velvety consistence of such hide renders it especially adapted to this use, by the grains of rice partially embedding themselves therein and becoming more thoroughly polished.

By means of the adjustable bars *t t* the wear on the flexible beaters *u u* may be compensated for, or beaters of different flexible material or materials be inserted, or it may be interspersed with beaters of alum-dressed hide.

The rice passes into the cylinder *q* by the spout *p*, and through the conical hood of the cylinder, which may be of taper form, and down along or through which, as the rice travels, it is pearled or "finished" by the action of the beater or beaters and cylinder combined. After being thus scoured or polished and pearled the rice may be allowed to escape through openings at the off end of the cylinder into a trough, *v*, which may deliver it into any suitable receptacle, the douse or refuse matter and dust being, in the course of polishing the rice, worked off through the screen-covered openings in the cylinder into a box or case, *w*, surrounding the latter, said screens also serving to ventilate the rice.

What is here claimed as new and useful, is—

A series of revolving beaters, of any suitable flexible material, in combination with a surrounding casing or cylinder, the interior surface of which is of rough, stone-like character, for operation together in pearling or polishing rice, substantially as specified.

ROBERT ANDERSON.

Witnesses:

GEO. M. ANDERSON,

C. D. MOREHOUSE.